(12) United States Patent
Schroter

(10) Patent No.: US 8,554,219 B2
(45) Date of Patent: Oct. 8, 2013

(54) METHOD OF SELECTING A NETWORK BY A MOBILE APPARATUS

(75) Inventor: Andreas Schroter, Meerbusch (DE)

(73) Assignee: Koninklijke KPN N.V., The Hague (NL)

( * ) Notice: Subject to any disclaimer, the term of this patent is extended or adjusted under 35 U.S.C. 154(b) by 749 days.

(21) Appl. No.: 12/518,915

(22) PCT Filed: Dec. 3, 2007

(86) PCT No.: PCT/EP2007/010459
§ 371 (c)(1),
(2), (4) Date: Jun. 12, 2009

(87) PCT Pub. No.: WO2008/074394
PCT Pub. Date: Jun. 26, 2008

(65) Prior Publication Data
US 2010/0035613 A1     Feb. 11, 2010

Related U.S. Application Data

(60) Provisional application No. 60/876,364, filed on Dec. 20, 2006.

(30) Foreign Application Priority Data

Apr. 2, 2007   (EP) ..................................... 07006829

(51) Int. Cl.
*H04W 4/00*   (2009.01)
(52) U.S. Cl.
USPC ................... 455/435.2; 455/432.1; 455/435.3

(58) Field of Classification Search
USPC ................... 455/432, 434, 456.1, 557, 435.1, 455/435.2, 432.1; 370/351
See application file for complete search history.

(56) References Cited

U.S. PATENT DOCUMENTS

| | | | |
|---|---|---|---|
| 6,954,649 B2 * | 10/2005 | Kotzin ........................ 455/456.1 |
| 2002/0168976 A1 * | 11/2002 | Krishnan ........................ 455/432 |
| 2006/0023693 A1 * | 2/2006 | Aso et al. ........................ 370/351 |
| 2006/0148522 A1 * | 7/2006 | Chipchase et al. ............ 455/557 |
| 2006/0286977 A1 * | 12/2006 | Khandelwal et al. ....... 455/432.1 |
| 2007/0275717 A1 * | 11/2007 | Edge et al. ...................... 455/434 |

FOREIGN PATENT DOCUMENTS

| | | | |
|---|---|---|---|
| EP | 1587252 A1 * | 10/2005 |
| WO | 02076117 A2 | 9/2002 |
| WO | 2004056136 A2 | 7/2004 |

* cited by examiner

*Primary Examiner* — Dwayne Bost
*Assistant Examiner* — Larry Sternbane
(74) *Attorney, Agent, or Firm* — McDonnell Boehnen Hulbert & Berghoff LLP

(57) ABSTRACT

A method is provided for selecting an available network by a mobile apparatus, such as a mobile phone. As a subscriber moves from country to country he needs to switch from network to network, with limited control over the network chosen and the services provided by the network. The mobile phone is provided with parameter sets, providing connection parameters for more than one network based upon the geographic location that the mobile phone is in. The mobile phone may provide for automatic selection of an available network.

18 Claims, 2 Drawing Sheets

METHOD OF SELECTING A NETWORK BY A MOBILE APPARATUS

FIELD OF THE INVENTION

The invention relates to a method for selecting a network by a mobile apparatus.

The invention also relates to a mobile apparatus for selecting a wireless network, and further relates to a communication system comprising such a mobile apparatus.

BACKGROUND OF THE INVENTION

Telecommunications are rapidly moving away from the past when national network operators only offered their customers a subscription for their local or home network. This may be considered to be a direct connection.

The needs of subscribers is also changing—no longer just limited to voice communication, they now also require a wide range of data services in an international setting.

The mobile apparatus of the user has evolved from a mobile telephone into a mobile terminal resembling a computer with, for example, the ability to send and receive e-mails, to access the Internet, and to provide voice communication.

Typically, the subscriber has a subscription for one home network. To identify the subscriber and to secure the connection to the network, the mobile apparatus comprises a Subscriber Identification Module (SIM), which holds the International Mobile Subscriber Identity (IMSI), network specific keys and other parameters. This subscriber and network specific data allows registration with the home network—they are highly confidential and are only disclosed to the manufacturer of the SIM.

As a subscriber moves from country to country, he will be confronted with the need to switch from network to network. Currently, the process of identifying and registering with a foreign network (that is, any network which is not the subscriber's home network) is highly automated and usually requires no direct input from the user—this is called roaming. This is made possible by the home network operator making roaming agreements with the network operators in different countries—when a subscriber tries to access a foreign network, a check is first made if he is entitled to use the network under such a roaming agreement. This check typically includes the mobile apparatus transmitting its IMSI. The foreign network then checks to see whether the subscriber is permitted to use the network and under what conditions, usually by making an inquiry to the home network. This may be considered to be an indirect connection.

Often, the services provided by a foreign network will be limited compared to the services that the subscriber would enjoy on his home network. Additionally, the charges to the subscriber for the use of foreign network are generally higher under roaming agreements. Further disadvantages are that the established inter-network billing mechanisms prevent service-specific charging to a certain degree, that data communication suffers if it must be routed to/from the home network, and that emergency calls have to be routed according to network-inherent location information.

Internationally-acting non-telecom companies, such as Mobile Virtual Network Operators (MVNOs) and Mobile Virtual Network Enablers (MVNEs), are becoming more prevalent, increasing the choice for the subscriber. MVNO's and MVNE's who want to operate internationally have to provide services in all their markets. Therefore, they either team up with one home network and accept that the available services outside that home network will be very restricted and/or expensive, or they team up with multiple network operators creating a complex system for their subscribers.

SUMMARY OF THE INVENTION

It is an object of the invention to provide a method of using a mobile apparatus in different geographic locations which provides more flexibility for the issuer of that apparatus and/ or a higher service level for the user of that apparatus in different geographic locations.

According to a first aspect of the invention the object is achieved by providing the mobile apparatus (for example, a mobile terminal or a mobile telephone) with a plurality of parameter data sets, wherein each data set comprises a geographic tag and connection parameters for a wireless network available in the geographic location corresponding to the geographic tag, the method of selecting the network comprising searching for an available wireless network; determining the geographic location associated with the available wireless network; selecting the parameter data set which comprises the geographic tag corresponding to the geographic location, and registering with the available wireless network using the connection parameters of the selected parameter set.

The plurality of data sets allows the mobile apparatus to support a large number of subscriber identities and to select the one that it is most suitable for the needs of the issuer and/or the user. The parameters in the data sets may be chosen such that foreign networks no longer recognize the mobile apparatus as a foreign or guest subscriber, but recognize the apparatus as a home subscriber and therefore permit a direct connection. If the data sets are provided in a SIM-card, the issuer can assert full control over the networks that their subscribers may use, determining, for example, the range of services available, data limits, data speeds, voice quality and tariffs. This also means that the issuer does not need to rely on roaming agreements to provide the subscriber with the voice and data services in different countries.

Furthermore the confidential data can be kept confidential on a bilateral basis between each involved network operator and the manufacturer of the apparatus. It is not necessary to share it on a wider basis or with the issuer (e.g. MVNE) of the apparatus.

According to an aspect of the invention, the geographic tag corresponds to one or more geographic areas selected from the group consisting of a country, a state, a region, a continent, an island, a geographic coordinate, a political region, and any combination thereof. This provides a high degree of flexibility to maximize the use of desired networks throughout the area covered by the network, which may cross political and/or geographic borders.

According to an aspect of the invention, the mobile apparatus receives the plurality of data sets by accepting an identification module comprising the plurality of data sets and enabling data access between the mobile apparatus and the identification module. This has the advantage that the identification module may be supplied to the subscriber separately, and also means that the subscriber may use the identification in more than one apparatus to improve flexibility.

According to an aspect of the invention, the determining of the geographic location comprises identifying the geographic location from the transmission of the available wireless network, from a manual input provided by the user of the mobile apparatus or a combination thereof. Although using the transmission of the available network means that switching may be made automatic, it provides flexibility if the user is allowed to perform the selection. For example, he may wish to use a certain network because a certain service is provided, even though the strength of the connection is very low. A combination of both inputs may be also useful.

According to an aspect of the invention, searching for an available network comprises searching for a first available wireless network and searching for a second available wireless network; the determining comprises identifying the geographic location from the transmission of the second available wireless network, and the registering comprises registering with the first available wireless network. This provides more flexibility for determining the geographic location, and more objectivity. The prevalence of positioning systems, such as GPS, means that the geographic location may be determined by a network intended for that purpose, and the mobile apparatus does not only rely on the geographic identification provided by the network used for communication, as this may be chosen based on commercial and political grounds.

According to an aspect of the invention, more than one data set comprises identical geographic tags and the mobile apparatus comprises an algorithm for selecting between a plurality of available networks, and wherein the selecting comprises identifying the parameter data sets having the geographic tag corresponding to the geographic location, and selecting one of the data sets using said algorithm. Typically, more than one network will be available at a particular geographic location, so it is advantageous to predetermine as far as possible how the mobile apparatus will make the choice. This improves both reliability and the quality of the service provided to the user. It may also be advantageous to provide an algorithm with a criterion selected from the group consisting of the quality of the wireless connection between the available network and the mobile apparatus, the signal strength of the wireless connection between the available network and the mobile apparatus, a preference provided by the user of the mobile apparatus, a preference provided by the service provider, a preference provided by the issuer of the mobile apparatus, the type of connection permitted by the available network, the absence of an available network offering a predetermined type of connection, one or more connection parameters in the data sets, and any combination thereof.

According to an aspect of the invention, each data set further comprises configuration parameters and the method further comprises configuring features of the mobile apparatus using the configuration parameters of the selected parameter set. This has the advantage for the user that the configuration of the mobile apparatus may be updated automatically to match the geographic location (for example, menus in the local language) and the selections and settings available on the apparatus will also be updated to match the available options and services provided by the available network. This improves the user-friendliness of the method.

According to an aspect of the invention, the method further comprises providing the mobile apparatus with data comprising at least one portion of a parameter data set by the available network or by the user of the mobile apparatus. This allows either complete data sets or individual parameters in chosen data sets to be updated. It may be advantageous to update automatically via the wireless network, and flexibility is maximized if the user is also available to update parameters manually. In this way, the data sets may be kept up-to-date to provide a reliable and user-friendly service. A combination of both types of input is also useful.

BRIEF DESCRIPTION OF THE DRAWINGS

These and other aspects of the invention are apparent from and will be elucidated with reference to the embodiments described hereinafter.

In the drawings.

DETAILED DESCRIPTION OF THE PREFERRED EMBODIMENTS

Figure 1:
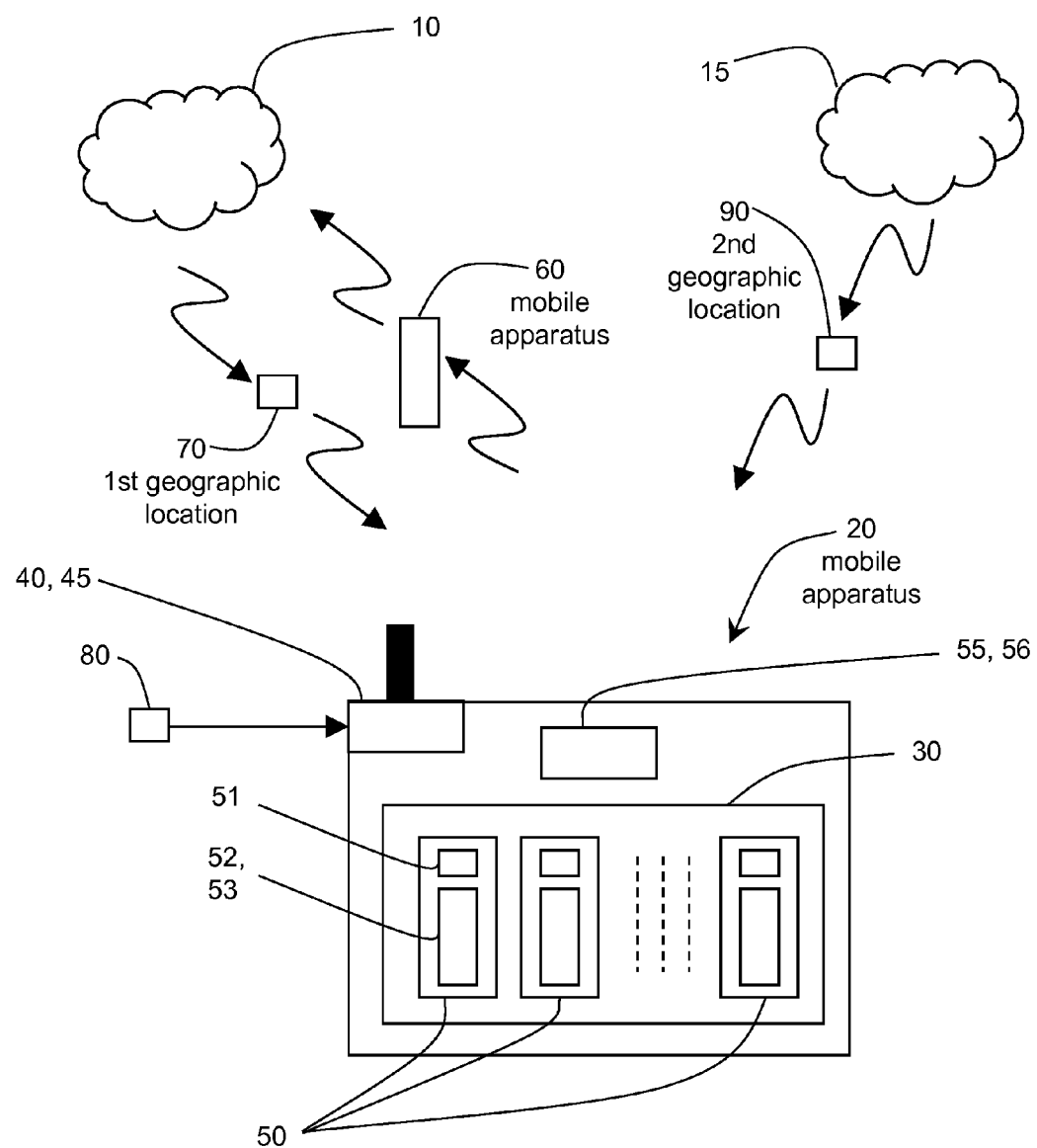
FIG. 1 shows a communication system according to the invention.
Figure 2:
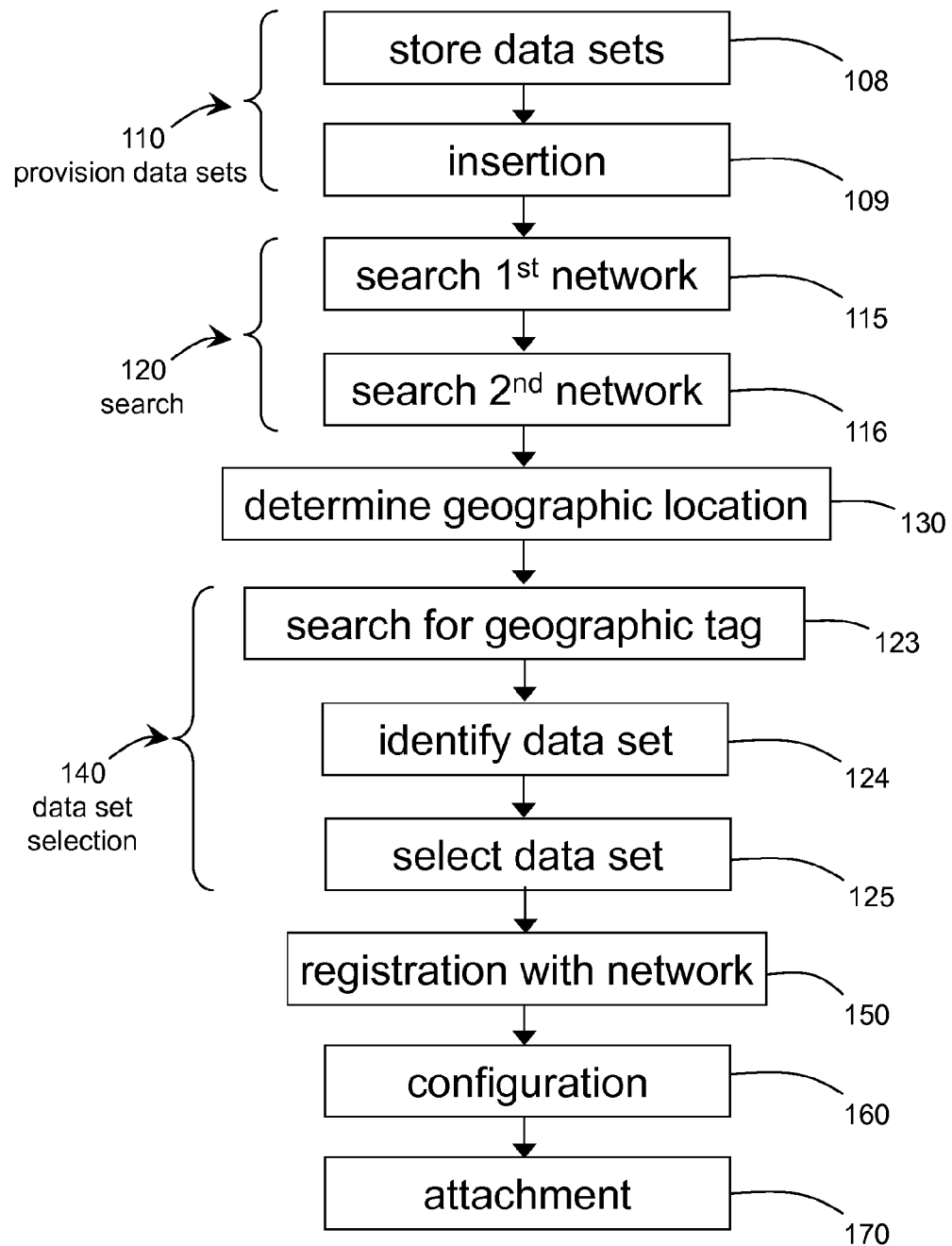
FIG. 2 shows a method of selecting a network according to the invention. The figures are purely diagrammatic and not drawn to scale. Particularly for clarity, some dimensions are exaggerated strongly. Similar components in the figures are denoted by the same reference numerals as much as possible.

FIG. 1 shows a communication system according to an embodiment of the invention, and FIG. 2 shows the method used for selecting a network within the communication system according to the invention.

A network 10 is provided to cover a particular geographic location in which a subscriber may wish to use his mobile apparatus 20 This may be, for example, a country, a state, a region, a continent, an island, a geographic coordinate, a political region, or any combination of these types of geographic location.

The mobile apparatus 20 comprises search means 40 configured to detect an available wireless network 10; and registration means 56 configured to register with the available radio network 10, so that the mobile apparatus 20 can register an available wireless network 10 and make use of its services.

The mobile apparatus also comprises, typically in a memory module, a plurality of parameter data sets 50, wherein each data set 50 comprises a geographic tag 51 and connection parameters 52 for a wireless network 10 available in the geographic location corresponding to the geographic tag 51. The geographical tag 51 is used as a means to select the data set 50, and therefore also the connection parameters 52 that are found in the data set 50. Each data set 50 contains the data that the mobile apparatus 20 needs to register with a network 10 in a particular geographic location. Typically the network 10 will then hold a counterpart of connection parameters 52 to permit registration. The geographic tag is chosen to be associated with that particular geographical location covered by the wireless network 10. The connection parameters 52 may include, for example, identification numbers, authorization keys, algorithms, programs, call-back parameters.

The geographic tag 51 may comprise, for example, network identification numbers, or area identification numbers, such that it corresponds with a country, a geographic coordinate, a geographic region, a political region, a state, and any combination thereof.

The mobile apparatus 20 further comprises:

identification means 45 configured to determine the geographic location 70,80,90 associated with the available network 10, and selection means 55 configured to select the parameter data set 50 which comprises the geographic tag 51 corresponding to the geographic location 70, thus enabling the mobile apparatus 20 to register with the network 10 represented by the selected data set 50.

When the user tries to operate the mobile apparatus 20 in a particular geographical location, the mobile apparatus searches 120 for available networks 10 using the search means 40. When a network 10 has been detected, the mobile apparatus 20 determines 130, using the identification means 45, the geographic location 70 that the network is available in. It may do this, for example, based upon the network identification number received from the available network 10.

The mobile apparatus 20 then searches 123 through the available data sets 50 for a set which has a geographic tag 51 the same as the geographic location 70 just identified and selects 140 the appropriate data set 50 using the selection means 55. The mobile apparatus 20 then uses the connection parameters 52 from the selected data set 50 to register 150 with the available network 10.

Alternatively, the method of selecting a network may be modified by searching 120 twice—the first time 115 for a first available wireless network 10 and a second time 116 for a second available wireless network 15; determining 130 the geographic location using the identification means 45 by receiving data comprising the geographic location 90 transmitted by the second network 15, but registering 150 with the first network 10. The second network 15 may be a wireless network suitable for telecommunications itself, or it may be a wireless network 15 dedicated to providing location information such as GPS.

Alternatively, the geographic location 80 may be directly entered or selected by the user into the mobile apparatus 20.

The data sets 50 may be implemented as a lookup table based upon the geographic tag 51, but it will be apparent to the skilled person that any similar form of data storage and retrieval may be used.

The mobile apparatus 20 may be provided 110 with the plurality of data sets 50 by storing 108 the data sets in an identification module 30 which may be fixed in the mobile apparatus, or preferably removable. If the identification module 30 is removable, the module 30 is connected to the mobile apparatus 20 in some way such that data access may be enabled—for example, if the identification module 30 is a SIM, it is connected by inserting 109 it into a corresponding contact socket comprised by the mobile apparatus 20.

Alternatively, the data sets 50 may be downloaded directly into the mobile apparatus 20 using any conventional way, the data sets 50 may be manually entered into the mobile apparatus 20 by the user, or some combination of these methods. The data sets 50 may also be downloaded into the mobile apparatus 20 via an available wireless network 10, 15. A secure or encrypted connection may be used for such a data set download—the parameters necessary to secure the connection may be part of connection parameters 52. It will also be apparent to the skilled person that the data sets 50 may be wholly or partially updated, and that the data download may be provided for an individual or groups of subscribers.

If the plurality of data sets 50 is stored in a SIM or similar identification module 30, the issuer may supply the module 30 to its subscribers which allows a standard mobile apparatus 20 to operate in a plurality of countries under direct control of the issuer.

Currently, SIM cards 30 only support the identities of one network operator. To provide the same flexibility for the subscriber as is achieved with the invention, the service provider would have to issue multiple SIM cards 30, and rely on the user to insert the appropriate one as the mobile apparatus 20 is moved from country to country. This is a complex and unreliable system.

SIM cards 30 are known which support two billing options, private and business, for the same network, but this is selected by the user and is not dependent on geographic location 70,80,90.

It may be advantageous to provide more than one data set 50 with the same geographic tag 51. In that case, selection 140 by the selection means 55 comprises the steps of identifying 124 the parameter data sets 50 having the geographic tag 51 corresponding to the geographic location 70, and selecting 125 one of the data sets 50 using an algorithm for selecting between a plurality of available networks, where for each network a data set 50 is available in the mobile apparatus 20.

The algorithm may use one or more criteria to make the selection such as connection quality, signal strength, preferences by the user, preferences by the service provider and/or issuer, a manual selection by the user, the type of connection permitted by an available network 10, the absence of an available network 10 offering a predetermined type of network—for example, a direct connection would always be preferred when available—or one or more of the communication parameters 52 in the data sets 50.

When the mobile apparatus 20 is operating via a foreign network, it may be advantageous to configure 160 the mobile apparatus 20 depending upon the geographic location 70,80, 90. For this purpose, the data set 50 may comprise configuration parameters 53 for the mobile apparatus 20, for example, appropriate national language, appropriate menus, selectable lists of available networks, selectable lists of roaming partners, selectable lists of available services. The mobile terminal 20 is configured 160 according to these configuration parameters 53, based upon the geographic location, at any convenient step during the method of selecting a network, and preferably after the mobile apparatus 20 has registered 150 with the available network 10.

Alternatively, the mobile apparatus 60 may be provided with an initial configuration in which the data set 50 is selected with a geographic tag 51 that is the same as the geographic location 70 of the subscriber's home network. The method of selecting an available network 10 may then be modified by only selecting 140 a different data set 50 if the geographic location 90 is not the same as the geographic location 70 of the home network. Similarly, the method may also be modified such that the mobile apparatus 20 retains the last selected data set 50, and that selection 140 of a different data set 50 is only done when the geographic location 70 identified 130 is different to the last used geographic tag 51.

It may be advantageous to include data sets 50 which allow the mobile apparatus 20 to connect with foreign networks under roaming agreements—that is, enable indirect connections.

If the mobile apparatus 10 is required to select 125 from more than one network using the algorithm, additional criteria may include the type of agreement governing the connection and the availability of a network offering a direct connection.

If no direct connection is available, the mobile apparatus may be configured to regularly repeat the search 120 for an available network 10 which offers a direct connection. This may occur during idle time, and switching to a direct connection may be automatic, or only after user approval.

If the user expresses a preference by selecting 140 the available network 10, it would also be advantageous to provide the user with a visual or audible indication that he is not registered in the selected wireless network 10.

It may be advantageous to the user to implement the method such that it may be performed completely automatically.

The mobile apparatus may take any suitable form. For example, it may be a conventional mobile phone, a smartphone/PDA, but it may equally be a portable PC (laptop) equipped with wireless communication means.

It may also be other mobile devices, such as for example, a vehicle equipped with a wireless communication module. This may be configured, for example, to report malfunctions, to report accidents or collisions, to obtain information during use, or for mobile communications and/or mobile data exchange. It may also be integrated into the motor management system.

In summary, a method is provided for selecting an available network 10 by a mobile apparatus 20, such as a mobile phone. As a subscriber moves from country to country he needs to switch from network to network, with limited control over the network chosen and the services provided by the network. The mobile phone 20 is provided with more than one parameter sets 50, providing connection parameters 52 for more than one network based upon the geographic location 70,80, 90 that the mobile phone 20 is in. The mobile phone 20 preferably provides for automatic selection of the available network 10.

The invention claimed is:

1. A method for a mobile apparatus to select a wireless network, the method comprising:
   the mobile apparatus receiving a plurality of parameter data sets, wherein each parameter data set comprises a geographic tag and connection parameters for a wireless network in the geographic location corresponding to the geographic tag, and wherein more than one parameter data set of the plurality of parameter data sets comprise a given geographic tag;
   the mobile apparatus searching for an available wireless network;
   the mobile apparatus determining a geographic location associated with the available wireless network;
   the mobile apparatus identifying parameter data sets of the plurality of parameter data sets that comprise the given geographic tag corresponding to the geographic location; and
   the mobile apparatus selecting one parameter data set of the plurality of parameter data sets that comprises the given geographic tag; and
   the mobile apparatus registering with the available wireless network using the connection parameters of the selected parameter data set.

2. The method of claim 1, wherein the receiving comprises accepting an identification module that includes the plurality of parameter data sets, and enabling data access between the mobile apparatus and the identification module.

3. The method of claim 1, wherein the geographic tag corresponds to at least one geographic area selected from the group consisting of a country, a state, a region, a continent, an island, a geographic coordinate, and a political region.

4. The method of claim 1, wherein the determining comprises identifying the geographic location from at least one of a transmission of the available wireless network, and a manual input provided by a user of the mobile apparatus.

5. The method of claim 1, wherein the searching comprises searching for a first available wireless network and searching for a second available wireless network, wherein the determining comprises identifying the geographic location from a transmission of the second available wireless network, and wherein the registering comprises registering with the first available wireless network.

6. The method of claim 1, wherein selecting one of the parameter data sets of the plurality that contains the geographic tag comprises using at least one selection criterion chosen from the group consisting of:
   a quality of a wireless connection between the available wireless network and the mobile apparatus,
   a signal strength of the wireless connection between the available wireless network and the mobile apparatus,
   a preference provided by a user of the mobile apparatus,
   a preference provided by a service provider of the available wireless network,
   a preference provided by an issuer of the mobile apparatus,
   a type of connection permitted by the available wireless network,
   one or more connection parameters in the parameter data sets of the plurality,
   a type of agreement governing the wireless connection, and
   the available wireless network offering a predetermined type of connection.

7. The method of claim 1, wherein each parameter data set of the plurality includes configuration parameters, the method further comprising:
   the mobile apparatus configuring features of the mobile apparatus using the configuration parameters of the selected parameter data set.

8. The method of claim 1, wherein the receiving comprises receiving at least one of a first portion of the parameter data sets from the available network, and a second portion of the parameter data sets from a manual input by a user of the mobile apparatus.

9. A mobile apparatus for selecting a wireless network, the mobile apparatus comprising:
   a memory module containing a plurality of parameter data sets, wherein each parameter data set includes a geographic tag and connection parameters for a wireless network in a geographic location corresponding to the geographic tag, and wherein more than one parameter data set of the plurality of parameter data sets comprise a given geographic tag; and
   a wireless interface enabling the mobile apparatus to communicate via an available wireless network, wherein the mobile apparatus is arranged to (i) search to detect the available wireless network, (ii) determine a geographic location associated with the available wireless network, (iii) identify parameter data sets of the plurality of parameter data sets that comprise the given geographic tag corresponding to the geographic location, (iv) select one parameter data set of the plurality of parameter data sets that comprises the given geographic tag, and (v) register with the available wireless network using the connection parameters of the selected parameter data set.

10. The mobile apparatus of claim 9, wherein searching to detect the available wireless network comprises searching to detect a first available network and a second available radio network, wherein determining the geographic location comprises determining the geographic location from a transmission of the second available network, and wherein registering with the available wireless network comprises registering with the first available network.

11. The mobile apparatus of claim 9, further arranged to receive the memory module containing the plurality of parameter data sets and then enable data access between the mobile apparatus and the memory module.

12. The mobile apparatus of claim 9, wherein the geographic tag corresponds to at least one geographic area selected from the group consisting of a country, a state, a region, a continent, an island, a geographic coordinate, and a political region.

13. The mobile apparatus of claim 9, wherein the determining comprises identifying the geographic location from at least one of a transmission of the available wireless network, and a manual input provided by a user of the mobile apparatus.

14. The mobile apparatus of claim 9, wherein selecting one of the parameter data set that includes the given geographic tag comprises using at least one selection criterion chosen from the group consisting of:

a quality of a wireless connection between the available wireless network and the mobile apparatus,
a signal strength of the wireless connection between the available wireless network and the mobile apparatus,
a preference provided by a user of the mobile apparatus,
a preference provided by a service provider of the available wireless network,
a preference provided by an issuer of the mobile apparatus,
a type of connection permitted by the available wireless network,
one or more connection parameters in the parameter data sets of the plurality,
a type of agreement governing the wireless connection, and
the available wireless network offering a predetermined type of connection.

15. The mobile apparatus of claim 9, wherein each parameter data set of the plurality includes configuration parameters, wherein the mobile apparatus is further arranged to configure features of the mobile apparatus using the configuration parameters of the selected parameter data set.

16. The method of claim 9, wherein the receiving comprises receiving at least one of a first portion of the parameter data sets from the available network, and a second portion of the parameter data sets from a manual input by the user of the mobile apparatus.

17. A communication system, comprising:
at least one wireless network configured to communicate with mobile apparatuses;
a mobile apparatus including a memory module containing a plurality of parameter data sets, wherein each parameter data set includes a geographic tag and connection parameters for an available wireless network of the at least one wireless network in a geographic location corresponding to the geographic tag and wherein more than one parameter data set of the plurality of parameter data sets comprise a geographic tag corresponding to the geographic location of the at least one wireless network, wherein the mobile apparatus is arranged to (i) search to detect the available wireless network, (ii) determine the geographic location associated with the available wireless network, (iii) identify parameter data sets of the plurality of parameter data sets that comprise the given geographic tag corresponding to the geographic location, (iv) select one parameter data set of the plurality of parameter data sets that comprises the given geographic tag, and (v) register with the available wireless network using the connection parameters of the selected parameter data set.

18. The communication system of claim 17, wherein the searching comprises searching for a first available wireless network and searching for a second available wireless network, wherein the determining comprises identifying the geographic location from a transmission of the second available wireless network, and wherein the registering comprises registering with the first available wireless network.

* * * * *